US008800613B2

(12) United States Patent
Batty

(10) Patent No.: US 8,800,613 B2
(45) Date of Patent: Aug. 12, 2014

(54) FLUTED WOODTURNING TOOLS WITH HANDLES

(75) Inventor: Stuart Batty, Boulder, CO (US)

(73) Assignee: Stuart Batty Enterprises, LLC, Boulder, CO (US)

( * ) Notice: Subject to any disclaimer, the term of this patent is extended or adjusted under 35 U.S.C. 154(b) by 352 days.

(21) Appl. No.: 13/104,781

(22) Filed: May 10, 2011

(65) Prior Publication Data

US 2012/0006448 A1 Jan. 12, 2012

Related U.S. Application Data

(60) Provisional application No. 61/333,688, filed on May 11, 2010.

(51) Int. Cl.
*B27G 15/00* (2006.01)
*B23P 15/28* (2006.01)

(52) U.S. Cl.
USPC .............................................. 142/56; 76/119

(58) Field of Classification Search
USPC .............................. 142/1, 56; 76/119; 30/358
See application file for complete search history.

(56) References Cited

U.S. PATENT DOCUMENTS

| | | | | |
|---|---|---|---|---|
| 932,576 | A * | 8/1909 | Schigorev | 407/10 |
| 948,904 | A * | 2/1910 | Despre et al. | 30/493 |
| 1,968,463 | A * | 7/1934 | Mobley | 403/286 |
| 2,914,098 | A * | 11/1959 | Mclennan, Sr. | 142/56 |
| 3,187,825 | A * | 6/1965 | Bower, Jr. | 175/327 |
| 3,540,323 | A * | 11/1970 | Rishel | 408/186 |
| 3,549,337 | A * | 12/1970 | Palmer | 428/557 |
| 3,676,086 | A * | 7/1972 | Chay et al. | 428/545 |
| 4,095,630 | A * | 6/1978 | Kirk et al. | 142/56 |
| 4,754,787 | A * | 7/1988 | Smith | 142/56 |
| 4,924,924 | A * | 5/1990 | Stewart | 142/49 |
| 5,137,065 | A * | 8/1992 | Stewart | 142/56 |
| 2007/0151428 | A1* | 7/2007 | Hunter | 82/1.11 |
| 2012/0006448 | A1* | 1/2012 | Batty | 142/56 |
| 2013/0091991 | A1* | 4/2013 | Lee et al. | 76/119 |

FOREIGN PATENT DOCUMENTS

| | | | |
|---|---|---|---|
| CA | 2539739 | A1 | 9/2007 |
| GB | 591166 | A | 8/1947 |
| GB | 2192825 | A | 1/1988 |

OTHER PUBLICATIONS

File Carving Tools [online], retrieved on Oct. 6, 2011, retrieved from http://en.wikipedia.org/wiki/File:Carving_tools_2.jpg.
Search Report issued in Application No. GB1107843.3, dated Jun. 13, 2011.

* cited by examiner

*Primary Examiner* — Will Fridie, Jr.
(74) *Attorney, Agent, or Firm* — Faegre Baker Daniels LLP

(57) ABSTRACT

A woodturning tool according to embodiments of the present invention includes a shaft with a shaft tip, wherein the shaft tip is made of a first metal, and a cutting edge insert, at least a portion of an outer surface of the cutting edge insert rigidly joined to an inner surface of the shaft tip, the cutting edge insert formed of a second metal, the cutting edge insert being fluted and sharpened to form a cutting edge for woodturning, wherein the second metal is different from the first metal, and wherein the second metal is more wear-resistant than the first metal.

20 Claims, 7 Drawing Sheets

'GG'
'HH'

'II'

'JJ'

SECTION
'FF' - 'FF'
1g
'GG'
1f
'HH'
1g
'II'
'JJ'
7
7c
7
7a
6

5
4
5a
9
3
2
2
3a
3a
1

7
7
7c
7b
'FF'
'FF'

7d 7a
60°
7b
7
7e
7c

SECTION 'FF' - 'FF'

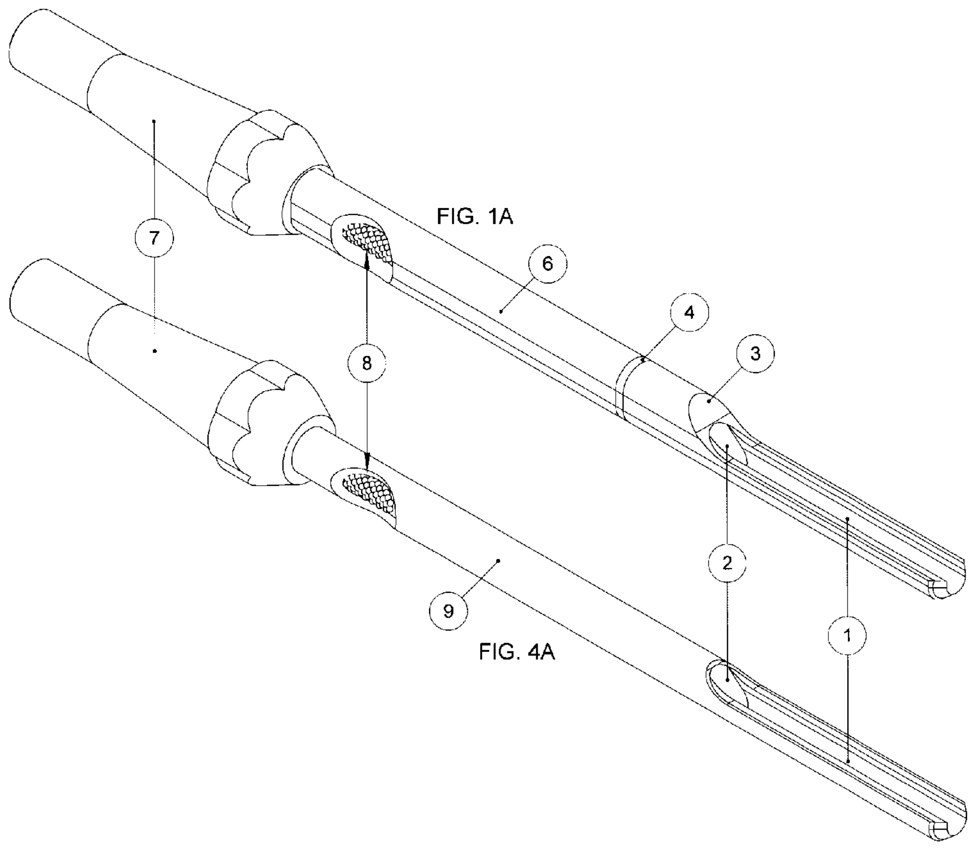
FIG. 1A
FIG. 4A
1
2
3
4
6
7
8
9
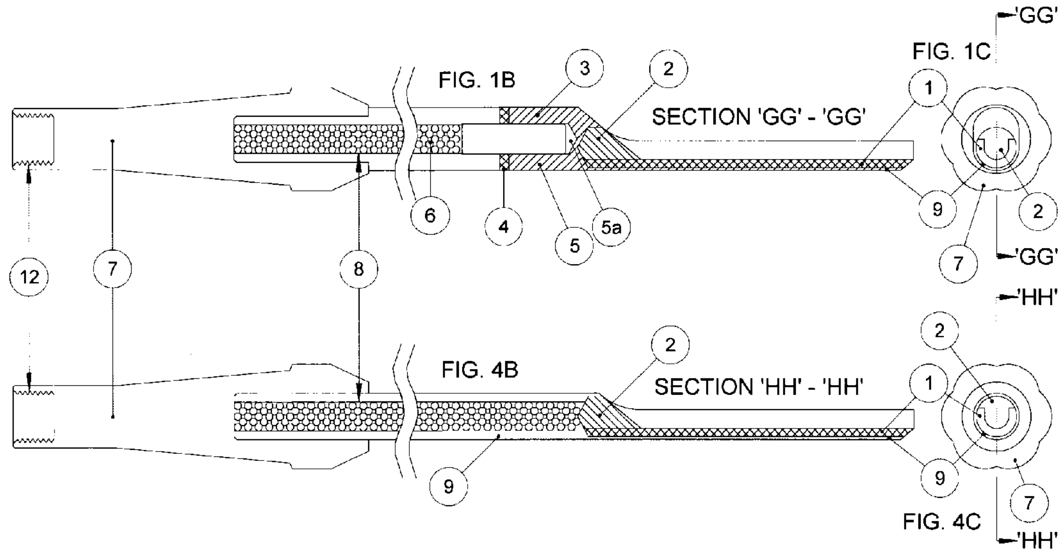
FIG. 1B
SECTION 'GG' - 'GG'
FIG. 1C
'GG'
'GG'
FIG. 4B
SECTION 'HH' - 'HH'
FIG. 4C
'HH'
'HH'
1
2
3
4
5
5a
6
7
8
9
12

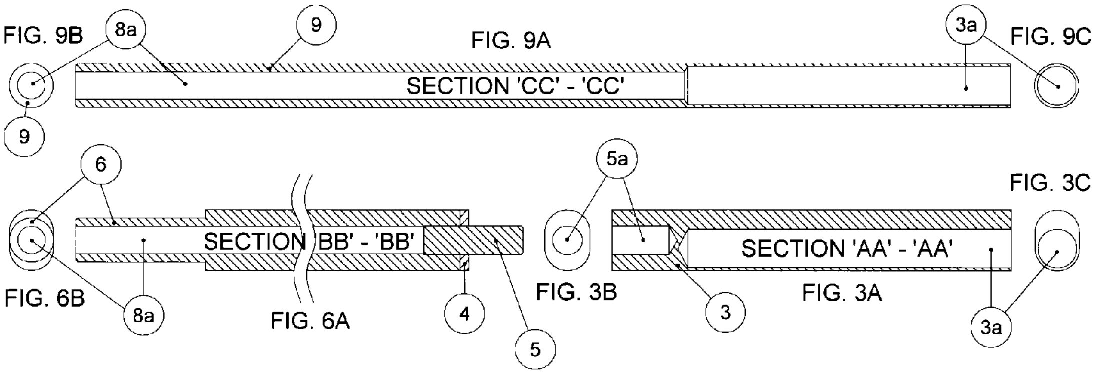
FIG. 9B
8a
9
FIG. 9A
SECTION 'CC' - 'CC'
3a
FIG. 9C
9
6
5a
FIG. 3C
SECTION BB' - 'BB'
SECTION 'AA' - 'AA'
FIG. 6B
8a
FIG. 6A
4
5
FIG. 3B
3
FIG. 3A
3a
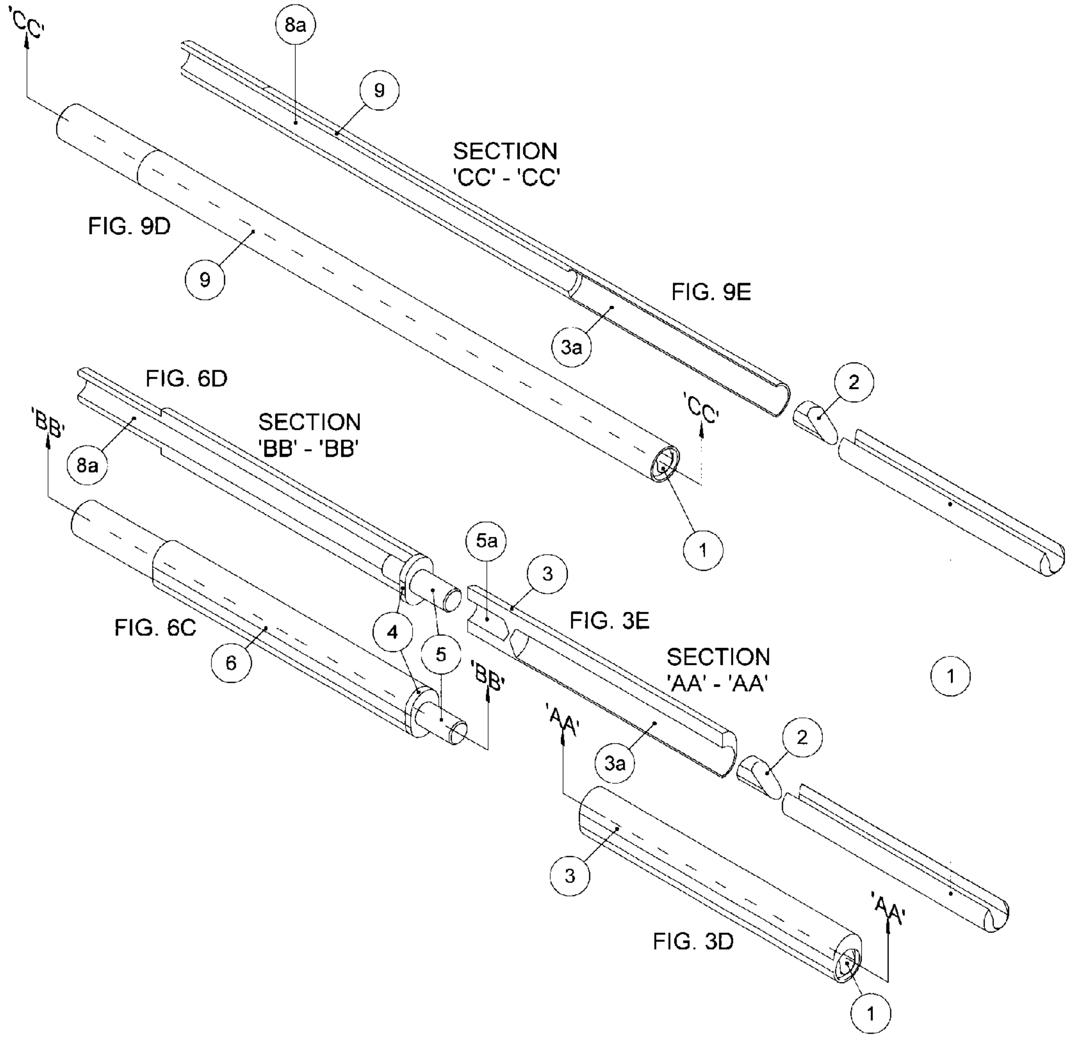
'CC'
8a
9
SECTION
'CC' - 'CC'
FIG. 9D
9
FIG. 9E
3a
2
'CC'
FIG. 6D
SECTION
'BB' - 'BB'
'BB'
8a
1
5a
3
FIG. 3E
FIG. 6C
4
5
SECTION
'AA' - 'AA'
1
6
'BB'
'AA'
2
3a
3
'AA'
FIG. 3D
1

SECTION 'VV' - 'VV'
12a
13
11
10
12

'DD'

10a
SECTION
'DD' - 'DD'

'VV'

'OO'

7
3
4
6
1

SECTION
'OO' - 'OO'
60°

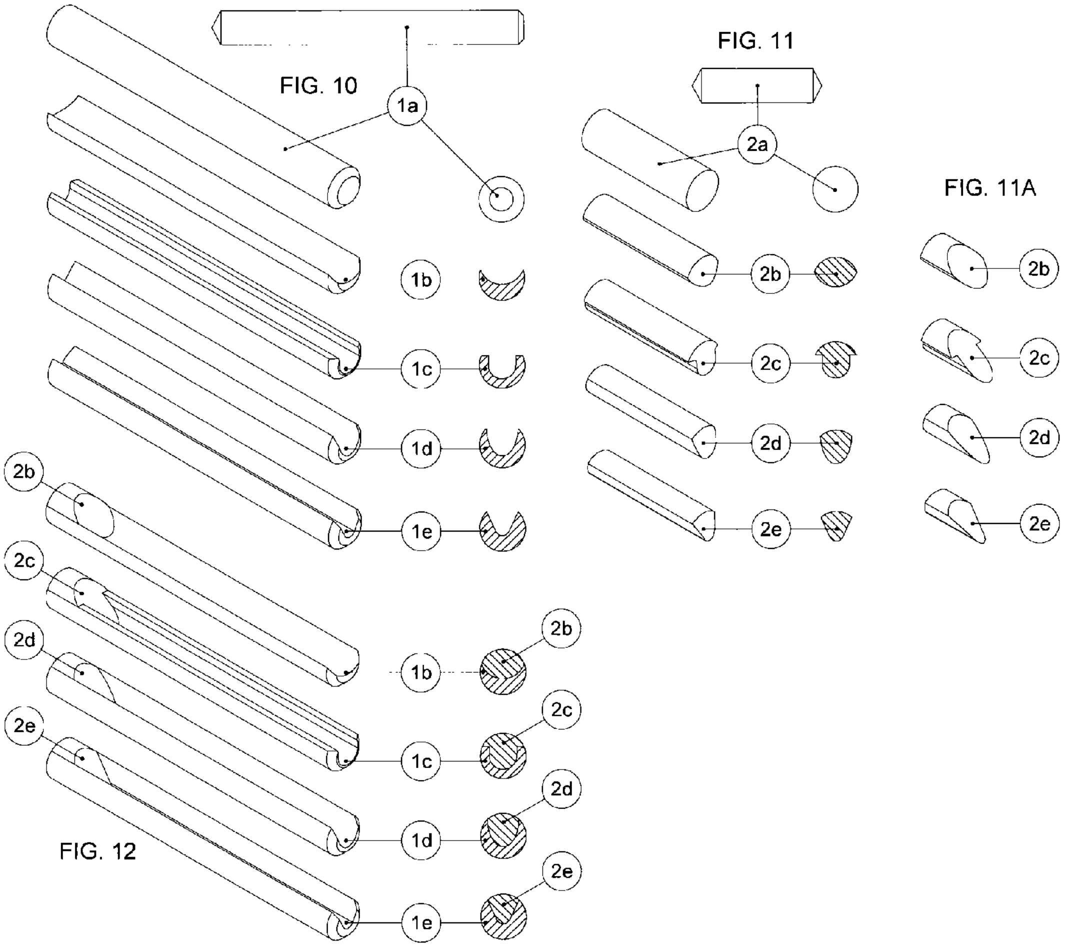
FIG. 10
FIG. 11
FIG. 11A
FIG. 12
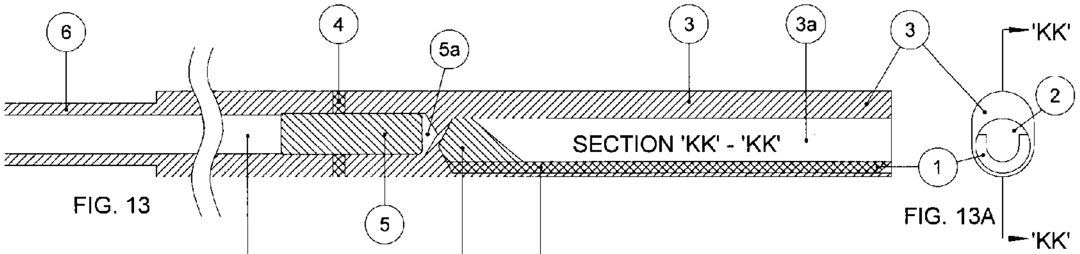
FIG. 13
FIG. 13A
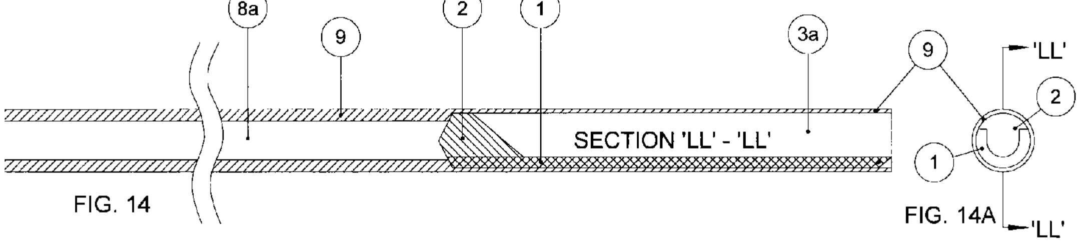
FIG. 14
FIG. 14A

'II'
'II'

'JJ'
'JJ'

'TT'
'TT'

'UU'
'UU'

SECTION 'II' - 'II'

SECTION 'JJ' - 'JJ'

SECTION 'TT' - 'TT'

SECTION 'UU' - 'UU'
1
1f
1g
2
3
3a
4
5
5a
6
7
8a
9

SECTION 'MM' - 'MM'
14
13
12a
11
7d
10a
10
7
7c
7e
12
15
60°

15a
'MM'

8
13
12
SECTION
'NN' - 'NN'
'NN'

10
7
6
3
2
4
1

'EE'

11

SECTION
'EE' - 'EE'

FLUTED WOODTURNING TOOLS WITH HANDLES

CROSS-REFERENCE TO RELATED APPLICATION

This application claims the benefit of U.S. Provisional Patent Application Ser. No. 61/333,688, filed on May 11, 2010, which is incorporated by reference herein in its entirety for all purposes.

TECHNICAL FIELD

Embodiments of the present invention relate to fluted woodturning tools of various kinds and types that are mounted into handles of varying lengths and are then used in a hand-held manner to shape a wooden workpiece while that workpiece is being rotated on a lathe.

BACKGROUND

Woodturning tools are used by all woodturners. With few exceptions, these tools are very similar within families (such as, for example, Bowl Gouges, Spindle Gouges, Spindle Roughing Gouges, Detail Gouges, and the like) for material selection and configuration. Thus there is no appreciable difference among sources for innate performance criteria. The few that utilize high performance materials are limited in supply and are considerably more expensive.

None of the currently available tools incorporate any improvements in mechanical design that would effectively damp vibration. None of the currently available tools incorporate variations of blade cross-section to improve blade beam strength. None of the currently available tools incorporate a manufacturing method that reduces the volume of expensive cutting edge material and thus reduces the overall material and manufacturing cost of the tool while maintaining its increased functionality. None of the currently available tools incorporate a strengthening bolster for the tool shaft that includes a vibration damping material such as flake graphite cast iron. None of the currently available tools incorporate a fiber and resin and aluminum composite handle which reduces initial weight, damps vibration, reduces vibration transfer to the user of the tool, and allows the user to adjust handle weight to suit his preference.

SUMMARY

According to embodiments of the present invention, a fluted woodworking lathe tool designed to include a laminated tool steel blade insert attached to a supporting substrate. The tool permits precision fitting of the blade/substrate composite into either a hollow oblong beam shaft or a round shaft. An inserted flute insert piece provides the transition from the blade to the oblong beam shaft and incorporates a beveled distal face which also functions as a chip deflection plate.

The finished tools may be made with and without a replaceable cutting edge insert assembly, for example.

The tools incorporate a hollow shaft that can be filled with metallic shot which damps vibration from the cutting edge and reduces vibration transfer to the handle. The oblong shape of the shaft significantly increases the vertical beam strength of the tool, thus reducing edge deflection during turning and thus reducing tool vibration. The tool shaft is attached to a cast iron bolster which provides structural support and further damps vibration from the cutting edge and reduces vibration transfer to the handle. The completed blade assembly is fitted into a handle utilizing a taperlock joint design. The removable handle is made of a concentric assembly of an extruded aluminum shaped insert that is encapsulated by a fiber reinforced composite sleeve with the distal end fitted with an insert that is shaped to accept the blade assembly and with the proximal end fitted with an insert shaped to accept end caps of various shapes. An internal threaded connection or some other connection mechanism may be included to secure the blade into the handle. The connection allows the user to quickly release and change blades thus utilizing one handle with multiple blades, according to embodiments of the present invention. The handle can be selectively filled with shot for damping as well as user preferred weight adjustment.

A primary tool option according to one embodiment of the present invention incorporates a replaceable cutting edge insert assembly which is attached to the oblong beam shaft with a gasketed loose tenon arrangement. This provides the user with a low cost way of refurbishing the tool once all the high-cost cutting edge material has been consumed.

Embodiments of the present invention include an improved fluted woodturning tool that significantly improves serviceability. Expensive wear-resistant cutting edge materials are machined in such a way that they can be adhered to and laminated with inexpensive materials and then further machined and processed in such a way that tool cutting edge performance is optimized by providing long cutting edge life and durability while keeping tool cost affordable. This adherence can be either through the use of adhesives or through the use of various metallurgical bonding techniques such as, but not limited, to brazing and/or soldering.

The void created in the tool blade during manufacturing may be stopped by the installation of a beveled deflection plate flute insert. This insert fortifies the strength of the tool as well as improves the chip extraction of those tools incorporating a fluted design.

The tool shaft may be a vertically oblong beam. This dramatically reduces tool deflection during turning and thus reduces the amplitude of any vibrations created within the tool.

The void created in the tool beam shaft during manufacturing may be filled with metallic shot. This shot damps vibration within the tool and reduces vibration transfer through the tool to the handle of the tool and thus to the hands of the tool user.

The tool shaft may be inserted into and adhered to a pearlitic matrix flake graphite cast iron bolster. This adherence can be achieved through the use of adhesives and/or through the use of various metallurgical bonding techniques such as, but not limited to, brazing or soldering.

The pearlitic matrix flake graphite cast iron bolster fortifies the strength of the tool, damps vibration within the tool, and reduces vibration transfer to the handle of the tool, according to embodiments of the present invention.

The exterior sleeve of the handle of the tool may be principally made of fiberglass fiber and a woven blend of carbon and aramid fibers, all of which are resin bonded into a rigid composite, according to embodiments of the present invention. The sleeve provides ergonomic compatibility to the human hand for both size and shape.

The interior of the handle of the tool may be compartmentalized through the use of an insert. These compartments may be selectively filled with metallic shot and thus permit a wide range of adjustments to handle weight at the discretion of the user.

The interior handle compartments may be selectively filled with metallic shot and thus provide additional vibration damping, again at the discretion of the user.

The cutting edge insert assembly may be made replaceable, thus reducing the lifetime cost of using the tool for the tool owner.

A fluted woodturning cutting blade may include one or more of the following features and/or characteristics, according to embodiments of the present invention:

A laminated composite of expensive wear resistant material and low cost support material, thus improving functionality while reducing cost.

A tool shaft with an optional oblong beam shaft shape which provides increased bending strength and thus reduces tool tip deflection and tool vibration while turning.

A hollow blade oblong beam shaft encapsulating metallic shot which dampens vibration.

Wherein the blade is held in a handle utilizing a precision taper lock bolster.

Wherein the bolster material provides increased vibration damping.

Wherein the bolster allows quick and easy blade interchangeability within the handle.

A handle for such a woodturning cutting blade may include one or more of the following features and/or characteristics, according to embodiments of the present invention:

Wherein the handle is a fiber reinforced composite which provides a reduction in initial overall tool weight.

Wherein the handle provides a mechanism for inclusion of metallic shot within the handle in such a way that provides vibration damping as well as user preferred weight adjustment.

Wherein the handle shape provides improved ergonomic comfort and compatibility for the user.

According to embodiments of the present invention, a fluted woodturning tool comprised of a cutting blade is assembled to a handle such that the combination of one or more of the features and/or characteristics described above give the user a vibration free or substantially vibration free tool.

A woodturning tool according to embodiments of the present invention includes a shaft having a shaft tip, wherein the shaft tip is made of a first metal, and a cutting edge insert, at least a portion of an outer surface of the cutting edge insert rigidly joined to an inner surface of the shaft tip, the cutting edge insert formed of a second metal, the cutting edge insert being fluted and sharpened to form a cutting edge for woodturning, wherein the second metal is different from the first metal, and wherein the second metal is more wear-resistant than the first metal.

The woodturning tool of paragraph [0022], wherein the second metal is high vanadium tool steel, and wherein the first metal is stainless steel.

The woodturning tool of paragraphs [0022] or [0023], wherein the second metal has a vanadium content from ten to fifteen percent, and wherein the first metal is a 400-series stainless steel.

The woodturning tool of any of paragraphs [0022] to [0024], wherein the shaft tip has an outer perimeter that is substantially uniform along its length, wherein the fluted cutting edge insert opens toward a first direction, and wherein a height of the shaft tip along the first direction is larger than a width of the shaft tip along a second direction perpendicular to the first direction.

The woodturning tool of any of paragraphs [0022] to [0025], wherein the shaft has an outer perimeter that is substantially the same along its length, and wherein the shaft outer perimeter is the same as the shaft tip outer perimeter.

The woodturning tool of any of paragraphs [0022] to [0026], wherein the at least a portion of the outer surface of the cutting edge insert is laminated to the inner surface of the shaft tip with brazing or polymeric adhesive.

The woodturning tool of any of paragraphs [0022] to [0027], wherein the shaft comprises an annular recess at least partially filled with metallic spherules.

The woodturning tool of any of paragraphs [0022] to [0028], wherein the tool permits addition of and withdrawal of the metallic spherules for user customized balancing and vibration dampening.

The woodturning tool of any of paragraphs [0022] to [0029], wherein the shaft tip is rigidly and reversibly coupled to the shaft to permit exchange of the shaft tip and the cutting edge insert for a new shaft tip and a new cutting edge insert.

The woodturning tool of any of paragraphs [0022] to [0030], further comprising a tenon and a gasket, wherein the gasket is located between a distal end of the shaft and a proximal end of the shaft tip, and wherein the tenon extends within the shaft, the shaft tip, and the gasket.

The woodturning tool of any of paragraphs [0022] to [0031], further comprising a flute insert, the flute insert rigidly joined to both the inner surface of the shaft tip and a proximal inner surface of the cutting edge insert.

The woodturning tool of any of paragraphs [0022] to [0032], wherein a distal face of the flute insert is beveled to provide chip deflection.

A method for manufacturing a woodturning tool according to embodiments of the present invention includes forming a shaft, forming a shaft tip of a first metal, inserting a cutting edge insert into the shaft tip, rigidly joining an outer surface of the cutting edge insert to an inner surface of the shaft tip, wherein the cutting edge insert is formed of a second metal, the cutting edge insert being fluted, and machining the cutting edge insert to form a cutting edge for woodturning, wherein the second metal is different from the first metal, and wherein the second metal is more wear-resistant than the first metal.

The method of paragraph [0034], wherein machining the cutting edge insert includes machining the cutting edge insert after rigidly joining the cutting edge insert to the shaft tip.

The method of paragraphs [0034] or [0035], wherein rigidly joining the outer surface of the cutting edge insert to the inner surface of the shaft tip includes laminating the outer surface of the cutting edge insert with the inner surface of the shaft tip by brazing or by applying a polymeric adhesive.

The method of any of paragraphs [0034] to [0036], further including forming an annular recess in the shaft, and at least partially filling the annular recess with metallic spherules.

The method of any of paragraphs [0034] to [0037], further including balancing the tool according to a user's preference by adding metallic spherules to the annular recess or withdrawing metallic spherules from the recess.

The method of any of paragraphs [0034] to [0038], further including forming the shaft tip and the shaft as a single unitary structure.

The method of any of paragraphs [0034] to [0039], further including rigidly and reversibly joining the shaft tip to the shaft to permit exchange of the shaft tip and the cutting edge insert for a new shaft tip and a new cutting edge insert.

The method of any of paragraphs [0034] to [0040], further including forming a flute insert, and rigidly joining the flute insert to both the inner surface of the shaft tip and a proximal inner surface of the cutting edge insert.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 1A (on Sheet 3) illustrates a perspective view of the finished cutting blade assembly of the tool that incorporates a replaceable cutting edge insert assembly including a cutaway illustrating the inclusion of shot in the oblong beam shaft, according to embodiments of the present invention.

FIG. 1B (on Sheet 3) illustrates a longitudinal centerline cross section of the finished cutting blade assembly of the tool of FIG. 1, according to embodiments of the present invention.

FIG. 1C (on Sheet 3) illustrates an end view from the distal end of the finished cutting blade assembly of the tool of FIG. 1, according to embodiments of the present invention.

FIG. 3A (on Sheet 2) illustrates a longitudinal centerline cross-section view of the oblong beam shaft tip taken along line A-A of FIG. 3D, without the round loose tenon and without the cutting edge insert, illustrating the drilled holes in this component, according to embodiments of the present invention.

FIG. 3B (on Sheet 2) illustrates a proximal end view of the oblong beam shaft tip illustrating the drilled hole for the round loose tenon, according to embodiments of the present invention.

FIG. 3C (on Sheet 2) illustrates a distal end view of the oblong beam shaft tip illustrating the drilled hole for the cutting edge insert, according to embodiments of the present invention.

FIG. 3D (on Sheet 2) illustrates a perspective view of the cutting blade assembly of the tool that shows the cutting edge insert assembled into the oblong beam shaft tip, according to embodiments of the present invention.

FIG. 3E (on Sheet 2) illustrates a longitudinal isometric exploded centerline cross-section view of the oblong beam shaft tip illustrating the drilled holes in this component, according to embodiments of the present invention.

FIG. 4A (on Sheet 3) illustrates a perspective view of the finished cutting blade assembly of the round shaft tool design type including a cutaway illustrating the inclusion of shot in the oblong beam shaft, according to embodiments of the present invention.

FIG. 4B (on Sheet 3) illustrates a longitudinal centerline cross section of the finished cutting blade assembly of the round shaft tool of FIG. 4 taken along line H-H of FIG. 4, according to embodiments of the present invention.

FIG. 4C (on Sheet 3) illustrates an end view from the distal end of the finished cutting blade assembly of the round shaft tool of FIG. 4, according to embodiments of the present invention.

FIG. 6A (on Sheet 2) illustrates a longitudinal centerline cross section view of the oblong beam shaft of the tool of FIGS. 1 and 6B-6C, taken along line BB-BB of FIG. 6C, according to embodiments of the present invention.

FIG. 6B (on Sheet 2) illustrates an end view from the proximal end of the oblong beam shaft of the tool of FIGS. 1 and 6A, according to embodiments of the present invention.

FIG. 6C (on Sheet 2) illustrates an isometric view of the short oblong beam shaft with the gasket and the round loose tenon installed, according to embodiments of the present invention.

FIG. 6D (on Sheet 2) illustrates a longitudinal centerline cross-section view of the oblong beam shaft of FIGS. 6A-6C with the gasket and the round loose tenon installed, according to embodiments of the present invention.

FIG. 9A (on Sheet 2) illustrates a longitudinal centerline cross-section view of the round shaft taken along line CC-CC of FIG. 9D, showing the relationship of the holes that may be gun drilled from each end, according to embodiments of the present invention.

FIG. 9B (on Sheet 2) illustrates a proximal end view of the round shaft illustrating the optional drilled hole, according to embodiments of the present invention.

FIG. 9C (on Sheet 2) illustrates a distal end view of the round shaft illustrating the drilled hole for the cutting edge insert, according to embodiments of the present invention.

FIG. 9D (on Sheet 2) illustrates a perspective view of the continuous style blade after partial assembly, according to embodiments of the present invention.

FIG. 9E (on Sheet 2) illustrates a longitudinal centerline exploded cross-section view of the round shaft style blade shown in FIG. 9D, according to embodiments of the present invention.

FIG. 10 (on Sheet 6) illustrates various types of flute shapes commonly used in woodturning as seen in isometric perspective and transverse cross-section, any of which may be used for the shape of the cutting edge insert, according to embodiments of the present invention.

FIG. 11 (on Sheet 6) illustrates various shapes for the flute inserts to accommodate the various flute shapes of FIG. 10 as seen in isometric perspective and transverse cross-section, according to embodiments of the present invention.

FIG. 11A (on Sheet 6) illustrates various flute inserts shown in FIG. 11 after they are split and beveled and are ready for assembly, according to embodiments of the present invention.

FIG. 12 (on Sheet 6) illustrates the isometric perspective and transverse cross-section views of the flute inserts of FIG. 11 installed within the flute shapes of FIG. 10, according to embodiments of the present invention.

FIG. 13 (on Sheet 6) illustrates the longitudinal cross-section centerline view of the tool design that incorporates a replaceable cutting edge at the in-process stage where it is partially assembled, according to embodiments of the present invention.

FIG. 13A (on Sheet 6) illustrates an end view from the distal end of the tool design that incorporates a replaceable cutting edge at the in-process stage where it is partially assembled, according to embodiments of the present invention.

FIG. 14 (on Sheet 6) illustrates the longitudinal cross-section centerline view of the tool design that incorporates a round shaft at the in-process stage where it is partially assembled, according to embodiments of the present invention.

FIG. 14A (on Sheet 6) illustrates an end view from the distal end of the tool design that incorporates a round shaft at the in-process stage where it is partially assembled, according to embodiments of the present invention.

Figures 1, 2, 3, 4, 5, 6, 7, 7A, 7B, 7C, 7D, 7E, 7F, 8:
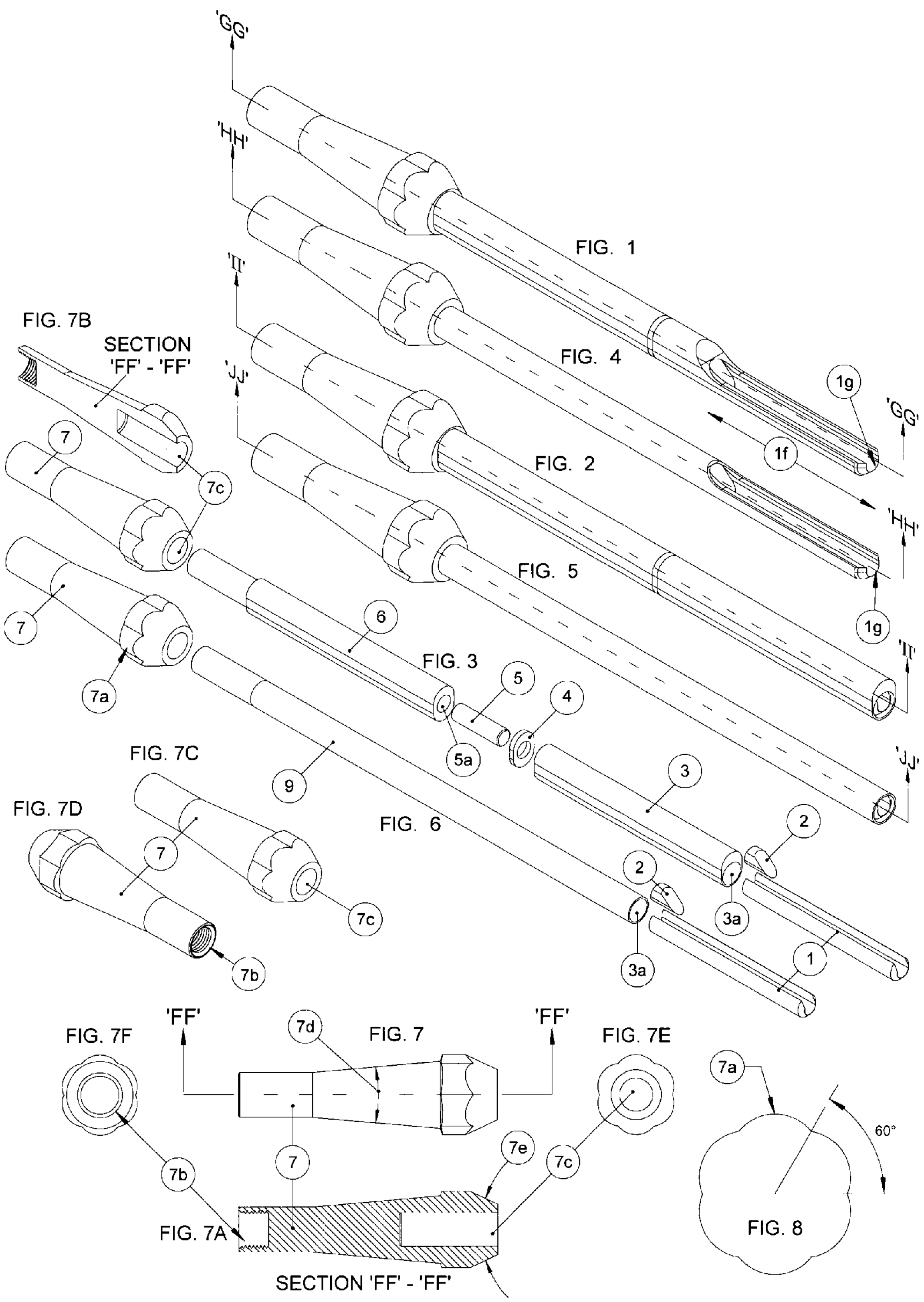
FIG. 1 (on Sheet 1) illustrates a perspective view of the finished cutting blade assembly of the tool that incorporates a replaceable cutting edge insert assembly, according to embodiments of the present invention.
FIG. 2 (on Sheet 1) illustrates a perspective view of the cutting blade assembly of the tool that incorporates a replaceable cutting edge insert assembly prior to final machining, according to embodiments of the present invention.
FIG. 3 (on Sheet 1) illustrates a perspective exploded view of the cutting blade assembly of the tool of FIG. 2, according to embodiments of the present invention.
FIG. 4 (on Sheet 1) illustrates a perspective view of the finished cutting blade assembly of the round shaft tool design type, according to embodiments of the present invention.
FIG. 5 (on Sheet 1) illustrates a perspective view of the cutting blade assembly of the round shaft tool prior to final machining, according to embodiments of the present invention.
FIG. 6 (on Sheet 1) illustrates a perspective exploded view of the cutting blade assembly of the round shaft tool, according to embodiments of the present invention.
FIG. 7 (on Sheet 1) illustrates a side view of the finished blade bolster, according to embodiments of the present invention.
FIG. 7A (on Sheet 1) illustrates a longitudinal centerline cross-section view of the finished blade bolster of FIG. 7 taken along line FF-FF of FIG. 7, according to embodiments of the present invention.
FIG. 7B (on Sheet 1) illustrates a longitudinal perspective centerline cross-section view of the finished blade bolster, according to embodiments of the present invention.
FIG. 7C (on Sheet 1) illustrates a perspective view of the finished blade bolster of FIG. 7, according to embodiments of the present invention.
FIG. 7D (on Sheet 1) illustrates an alternative perspective view of the finished blade bolster of FIG. 7, according to embodiments of the present invention.
FIG. 7E (on Sheet 1) illustrates a side elevation view of a distal end of the finished blade bolster of FIG. 7, according to embodiments of the present invention.
FIG. 7F (on Sheet 1) illustrates a side elevation view of a proximal end of the finished blade bolster of FIG. 7, according to embodiments of the present invention.
FIG. 8 (on Sheet 1) illustrates a cross sectional view of the lobe design of the bolster at its perimeter, according to embodiments of the present invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

LIST OF REFERENCES

The following reference numbers are used herein to refer to the following features:

1 Edge Insert
1*a* Edge Insert After External Machining and Drilling
1*b* Edge Insert After Flute Grinding
1*c* Edge Insert After Flute Grinding
1*d* Edge Insert After Flute Grinding
1*e* Edge Insert After Flute Grinding
1*f* Edge Insert assembly cross grind
1g Edge Insert Assembly Finish Ground Distal End
2 Flute Insert
2*a* Flute Inserts—ready for Shape Grinding
2*b* Flute Insert Alternate Shape
2*c* Flute Insert Alternate Shape
2*d* Flute Insert Alternate Shape
2*e* Flute Insert Alternate Shape
3 Shaft Tip for Edge Insert
3*a* Hole—Standard Tool Distal End
4 Gasket, Support to Shank
5 Tenon, Support to Shank
5*a* Tenon Hole
6 Shaft—Hollow or Solid
7 Bolster
7*a* Bolster Lobe
7*b* Bolster Proximal End Hole
*c* Bolster Distal End Hole
7*d* Bolster Taper Lock
7*e* Bolster Taper to Shaft
8 Shot, Metallic
8*a* Void, for shot
9 Shaft for Edge Insert—Hollow or Solid
10 Handle Distal End Insert
10*a* Taper In Handle Distal End Cap
10*b* Handle Extrusion
11 Bolster Locator Threaded—Handle Distal End
12 Handle Outside Sleeve
12*a* Handle Internal Voids
12*b* Lobe on Handle
13 Handle Extruded Insert
14 Handle Proximal End Insert
15 Handle Proximal End Cap
15*a* Lobe on Handle End Cap

DETAILED DESCRIPTION

Replaceable Cutting Edge Tools

FIG. 1 illustrates a bowl gouge variant of a fluted tool incorporating metallic shot damping and providing a replaceable cutting edge insert assembly. For the woodturner, the tool consists of a handle and a cutting blade assembly which are reversibly or removably joined together. The exploded view of the tool illustrating all of the various blade components is shown in FIG. 3.

The cutting edge insert 1 may be, but is not limited to, high vanadium tool steel commonly known as 10V or 15V. The initial cutting edge insert workpiece 1, illustrated as 1*a* in FIG. 10 on Sheet 6, starts as a round bar that has been cut to the appropriate length. The flute shape is machined into this piece by various means, including but not limited to milling, electrical discharge machining, and/or grinding. Variants of the flute shape are, but are not limited to, those shown as 1*b*, 1*c*, 1*d*, 1*e* in FIG. 10 on Sheet 6. This piece can be heat treated to optimal woodturning properties before or after machining depending on the choices of material and assembly method.

The flute insert 2 is made of, but is not limited to, 400-series stainless steel which starts as a round bar that has been cut to the appropriate length. The initial flute insert workpiece 2, illustrated as 2*a* in FIG. 11 on P. 1F, starts as a round bar that has been cut to the appropriate length. The obverse flute shape is machined into this piece by various means, including but not limited to milling, electrical discharge machining, extrusion, and/or grinding. Variants of the obverse flute shape are, but are not limited to, those shown as 2*b*, 2*c*, 2*d*, 2*e* in FIG. 11 on P. 1F. This piece can be heat treated to optimal properties before or after machining depending on the choices of material and assembly method.

The double length pieces shown in FIG. 11 on Sheet 6 may be machined into two separate inserts complete with chip deflecting bevel, as seen in FIG. 11A on Sheet 6, and may then be assembled into the oblong beam shaft tip 3 at the same time and with the same method as that for the cutting edge insert 1, according to embodiments of the present invention.

The oblong beam shaft tip 3 may be made of 400-series stainless steel which starts as a round bar that has been cut to the appropriate length, according to embodiments of the present invention. It may be machined by grinding into an oblong cross-sectional shape as seen in FIGS. 3B, 3C, 6B, and 13A, and may then be gundrilled from the distal end to a size so as to permit the cutting edge insert 1 to be inserted into the drilled hole 3*a* with a sliding fit, as shown in FIGS. 3A and 3C. It may also be gun drilled from the proximal end to a size which will allow the insertion of the round loose tenon 5 into the drilled hole 5*a*. Clearance between the cutting edge insert 1 and the oblong beam shaft tip 3 and the round loose tenon 5 allow for fitting as well as accommodating the chosen lamination joining method, whether it be brazing or a polymeric adhesive or other method. In the case of a polymeric adhesive, the cutting edge insert 1 and the oblong beam shaft tip 3 may be heat treated before assembly. If brazing is used, the joining and heat treating can occur during the same hardening heat treat cycle, according to embodiments of the present invention.

As illustrated in FIG. 3C the fluted cutting edge insert opens toward a first direction, and a height of the shaft tip along the first direction is larger than a width of the shaft tip along a second direction perpendicular to the first direction. As such, the cross-sectional shape of the shaft tip (which may also be the cross-sectional shape of the rest of the shaft) includes a substantially beam-shaped cross-section, which fortifies the shaft along the direction in which the fluted cutting tool opens, thereby providing improved durability and vibration reduction, according to embodiments of the present invention.

The final steps in finishing the cutting edge assembly include grinding across the distal portion of the oblong beam shaft tip 3 to open the flute of the tool. This transforms this area of the tool from what is shown in FIG. 2 on Sheet 1 and FIG. 13 on Sheet 6 to that shown in FIGS. 1, 1A, and 1B. The last step is sharpening, the grinding of the distal end of the tool, thus creating a suitable cutting edge on the tool.

The gasket 4 between the oblong beam shaft tip 3 and the oblong beam shaft 6 may be made of an aluminum bronze material. Purchased as sheet material, it is machined and formed in such a way that it can be mounted onto the round loose tenon 5 and has the same outside shape as the oblong beam shaft parts 3 and 6, according to embodiments of the present invention.

The oblong beam shaft to cutting edge assembly round loose tenon 5 may be made of 400-series stainless steel, according to embodiments of the present invention. It provides alignment and structural strength for the assembly and joining of the oblong beam shaft tip 3, the oblong beam shaft gasket 4, and the oblong beam shaft 6, according to embodiments of the present invention. It starts as a round bar that has been cut to the appropriate length. It may be machined by grinding into a precise diameter and is shown in FIGS. 1B, 3, 6D, and 6E, according to embodiments of the present invention.

The oblong beam shaft 6 is made of the same material and has similar processing as the oblong beam shaft tip 3 described above, according to embodiments of the present invention. The distal end of shaft 6 is machined to accommodate the installation of the gasket 4 and the round loose tenon 5. The proximal end is machined to a shape and size to allow its installation into and attachment to the bolster 7.

The bolster 7 may be made of pearlitic flake graphite cast iron. It starts as a round bar casting that has been cut to the appropriate length. The internal and external shapes and features are machined into this piece by various means, including but not limited to lathe turning, traditional grinding, profile grinding, and/or creep feed grinding. FIGS. 7, 7A, 7B, 7C, 7D, 7E, and 7F contain illustrations and design details of this part. If the bolster 7 is made of cast iron, after all machining is completed it may be given a corrosion inhibiting surface treatment such as, for example, plasma nitriding.

The metallic shot 8 used for filling the oblong beam shaft 6 can be any of many metallic particulate materials. According to some embodiments of the present invention, steel shot is a cost effective metallic filling. Metallic shot 8 may also be referred to as metallic spherules, according to embodiments of the present invention.

The following describes an exemplary assembly sequence, according to embodiments of the present invention.

The distal end of the tool blade is made up of the cutting edge insert 1, the flute insert 2, and the oblong beam shaft tip 3. After each is machined, they are joined together into the assembly shown in FIG. 3D. This may be done by brazing, according to embodiments of the present invention. If joined by brazing, the assembly can be heat treated afterwards for property optimization. If assembled by some other joinery method, the components may be heat treated before assembly.

The proximal end of the tool blade is made up of the gasket 4, the round loose tenon 5, the oblong beam shaft 6, the bolster 7, and the metallic shot 8, according to embodiments of the present invention. After each is machined, they are joined together. If brazing is used, the assembly can be heat treated after brazing. If assembled by some other joinery method, the components may be heat treated before assembly.

At this point the proximal end of the partially completed blade assembly may be filled with metallic shot 8 and joined to the bolster 7. As described above, this assembly method can utilize polymeric adhesives or brazing, for example. If the latter, this can be done during or after the tempering heat treating process. The proximal end of the tool oblong beam shaft 6 of the cutting blade assembly is inserted into the distal hole 7*c* of bolster 7 and is then affixed to the bolster 7. The completed blade assembly perspective view is shown in FIG. 1*a*. The completed blade assembly longitudinal centerline cross-section view is shown in FIG. 1*b*. The completed blade assembly end view looking from the distal end is shown in FIG. 1*c*.

According to embodiments of the present invention, the cutting edge assembly is replaceable. This replaceability of the cutting edge assembly may be accomplished by including the gasket 4 and the round loose tenon 5 between the oblong beam shaft tip assembly and the oblong beam shaft as well as adding the corresponding machining and processing to accommodate these components. The dimensional relationship of these components is illustrated in FIGS. 3D, 3E, 6C, and 6D. The assembly and joining of the oblong beam shaft tip 3, the oblong beam shaft tip to oblong beam shaft gasket 4, the oblong beam shaft to cutting edge round loose tenon 5, and the oblong beam shaft 6 is reversible in such cases. If the assembly joining uses polymeric adhesives, the oblong beam shaft 6 may be heat treated prior to assembly. If the assembly joining is by brazing, this can be done as part of the same hardening heat treat cycle used to join the cutting edge insert 1, the flute insert 2, and the oblong beam shaft tip 3, according to embodiments of the present invention.

A polymeric adhesive such as, but not limited to, Loctite 680 for the joint of the round loose tenon 5 and the gasket 4 to the oblong beam shaft tip 3 in and around hole 5A provides the bonding method for the transverse joining of the distal and proximal oblong beam shaft assemblies shown in FIGS. 3D and 6C, respectively, according to embodiments of the present invention. This adhesive may deteriorate when heated to 250° C. Therefore, simply putting the completed cutting blade in a kitchen oven at this temperature will allow the user to separate the two shafts to allow replacing the distal end assembly.

The bolster 7 includes a conical taper portion 7*d* which serves to support the blade while accurately and firmly locating the tool into the handle (see FIG. 8 on P. 1A), according to embodiments of the present invention. The cutting blade assembly is secured to the handle by tension created by a drawbolt style attachment, created by engaging a threaded bolster locator 11 which is secured inside the handle and which is engaged into the internal threaded proximal end bore 7B of the bolster 7, according to embodiments of the present invention.

Figures 19, 20, 21, 22, 23, 24, 25, 26, 27:
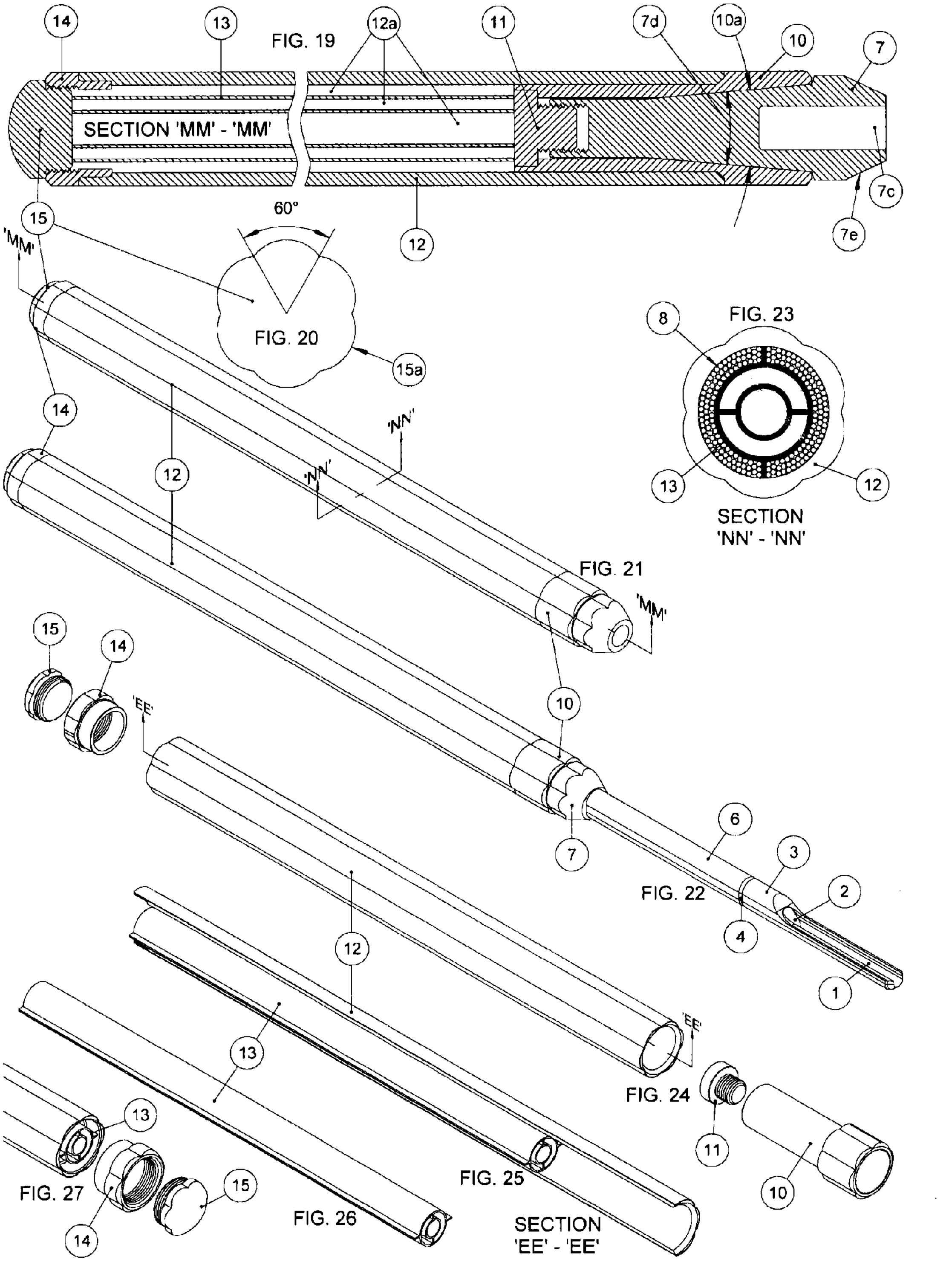
FIG. 19 (on Sheet 5) illustrates the foreshortened longitudinal cross-section centerline view of the handle assembly with the blade bolster installed, according to embodiments of the present invention.
FIG. 20 (on Sheet 5) illustrates an end view of the outer perimeter of the handle proximal end cap, according to embodiments of the present invention.
FIG. 21 (on Sheet 5) illustrates an isometric perspective view of a complete handle assembly, according to embodiments of the present invention.
FIG. 22 (on Sheet 5) illustrates an isometric perspective view of a complete tool, with the blade assembly inserted into the handle assembly, according to embodiments of the present invention.
FIG. 23 (on Sheet 5) illustrates a transverse cross section view of the handle taken along line NN-NN of FIG. 21, illustrating the inclusion of metallic shot used for damping, according to embodiments of the present invention.
FIG. 24 (on Sheet 5) illustrates an exploded isometric perspective view of the handle assembly, according to embodiments of the present invention.
FIG. 25 (on Sheet 5) illustrates a longitudinal cutaway view of the handle taken along line EE-EE of FIG. 24, showing the arrangement of the handle insert and the handle outside sleeve, according to embodiments of the present invention.
FIG. 26 (on Sheet 5) illustrates an isometric perspective view of the handle insert, according to embodiments of the present invention.
FIG. 27 (on Sheet 5) illustrates an exploded isometric perspective view of the proximal end of the handle assembly, according to embodiments of the present invention.

FIG. 22 on P. 1E illustrates the handle as assembled. The exploded view of the handle illustrating the various components is shown in FIG. 8, according to embodiments of the present invention. Details of the handles and the entire tool assembly are described below.

Round Shaft Tools

FIG. 4 on P. 1A illustrates the tool blade of a bowl gouge variant of a fluted tool that does not include a replaceable cutting edge insert assembly, according to embodiments of the present invention. For the woodturner, the tool consists of a handle and a cutting blade assembly which are reversibly joined together. The exploded view of the tool illustrating the various blade components is shown in FIG. 6, according to embodiments of the present invention.

The cutting edge insert 1 and the flute insert 2 may be the same as or similar to those described, above. For this round shaft style of tool, the oblong beam shaft assemblies may be replaced by a single round shaft 9.

The round shaft 9 may be made of, for example, 400-series stainless steel which starts as a round bar that has been cut to the appropriate length, according to embodiments of the present invention. It may then be gun drilled from the distal end as shown in FIG. 9A such that hole 3*a* is of a size which will allow the cutting edge insert 1 to be inserted into the drilled hole with a sliding fit. Clearances between the cutting edge insert 1 and the round shaft 9 allow for fitting as well as accommodating the chosen lamination joining method, for example brazing or a polymeric adhesive, according to embodiments of the present invention. In the case of polymeric adhesive, the cutting edge insert 1 and the round shaft 9 may be heat treated before assembly. If brazing is used, the joining and heat treating may occur during the same hardening heat treat cycle.

The round shaft tool version can be made with or without the addition of metallic shot added to the inside of the tool shaft, according to embodiments of the present invention. If metallic shot damping is included, then the proximal end of the tool is gun drilled to provide a void 8*a* in the shaft that accommodates the shot, as shown in FIG. 9A on Sheet 2, according to embodiments of the present invention.

Whether or not metallic shot is added to the inside of the tool shaft, the proximal end of the partially completed blade assembly may then be joined to the bolster 7. As previously described, this assembly method can utilize various joining procedures, including but not limited to polymeric adhesives and/or brazing. If brazing is used, this can be done during or after the tempering heat treating process.

The final steps in finishing the cutting edge assembly include grinding across the distal portion of the shaft 9 to open the flute of the tool, according to embodiments of the present invention. This transforms this area of the tool from what is shown in FIG. 5 on Sheet 1 and FIG. 14 on Sheet 6 to that shown in FIGS. 4, 4A, and 4B. A final step includes sharpening, for example by grinding of the distal end of the tool, thus creating a suitable cutting edge on the tool, according to embodiments of the present invention.

The completed blade assembly perspective view is shown in FIG. 4A on Sheet 3 for the shot filled version. The completed blade assembly longitudinal centerline cross-section view for the shot filled version is shown in FIG. 4B. The completed blade assembly distal end view is shown in FIG. 4C. For the version without any shot, the proximal end of the round shaft 9 is solid, as depicted in FIG. 5 on Sheet 1, according to embodiments of the present invention.

The finished blade assembly shown in FIG. 4 may then be attached to the handle shown in FIG. 21 in the same fashion as the tool shown in FIG. 22.

Handles

FIG. 21 on Sheet 5 illustrates the handle as assembled. The exploded view of the handle illustrating various components according to embodiments of the present invention is shown in FIGS. 24, 25, and 26.

Figures 7G, 15, 15A, 15B, 15C, 15D, 15E, 16, 17, 17A, 17B, 17C, 17D, 17E, 17F, 18:
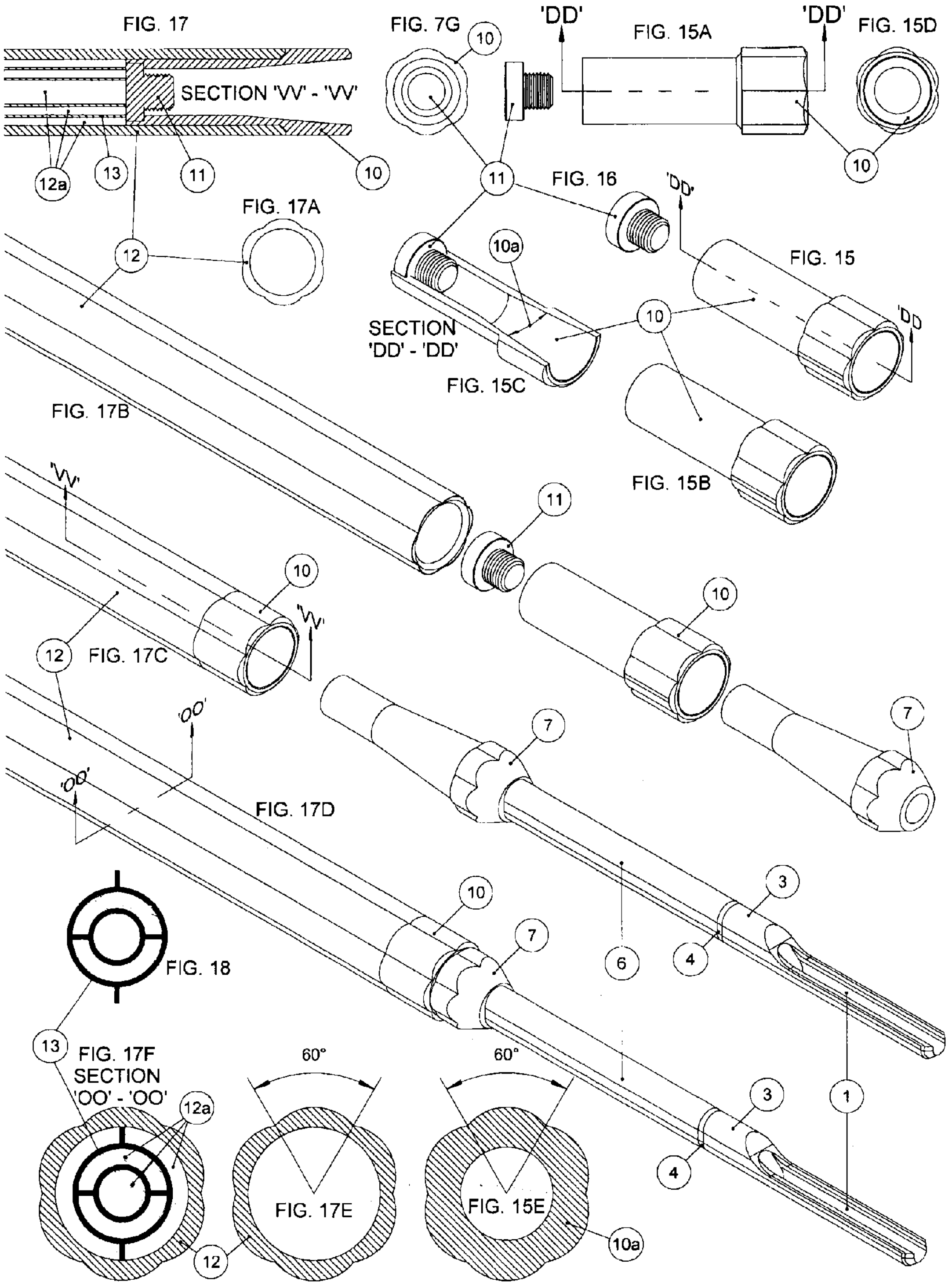
FIG. 7G (on Sheet 4) illustrates an end view of the bolster as seen from the distal end of an assembled handle with the bolster installed, according to embodiments of the present invention.
FIG. 15 (on Sheet 4) illustrates an isometric perspective view of the handle distal end insert, according to embodiments of the present invention.
FIG. 15A (on Sheet 4) illustrates a side view of the handle distal end insert along with the threaded bolster locator, according to embodiments of the present invention.
FIG. 15B (on Sheet 4) illustrates an isometric perspective view of the handle distal end insert, according to embodiments of the present invention.
FIG. 15C (on Sheet 4) illustrates the longitudinal cross-section centerline view of the handle distal end insert taken along line DD-DD of FIG. 15, with the threaded bolster locator installed, according to embodiments of the present invention.
FIG. 15D (on Sheet 4) illustrates an end view of the handle distal end insert from the distal end, according to embodiments of the present invention.
FIG. 15E (on Sheet 4) illustrates an end view of the extrusion from which the handle distal end insert is made, according to embodiments of the present invention.
FIG. 16 (on Sheet 4) illustrates an isometric perspective view of the handle threaded bolster locator 11, according to embodiments of the present invention.
FIG. 17 (on Sheet 4) illustrates a longitudinal cross-section centerline view of the distal end of the handle assembly, according to embodiments of the present invention.
FIG. 17A (on Sheet 4) illustrates an end view of the handle outside sleeve, according to embodiments of the present invention.
FIG. 17B (on Sheet 4) illustrates an exploded isometric perspective view of the distal end of the handle assembly along with the blade bolster, according to embodiments of the present invention.
FIG. 17C (on Sheet 4) illustrates an exploded isometric perspective view of the distal end of the handle assembly along with the blade assembly, according to embodiments of the present invention.
FIG. 17D (on Sheet 4) illustrates an isometric perspective view of the distal end of the handle assembly, according to embodiments of the present invention.
FIG. 17E (on Sheet 4) illustrates an end view of the handle outside sleeve showing the shape details of the surface lobes, according to embodiments of the present invention.
FIG. 17F (on Sheet 4) illustrates a transverse cross section view of the handle assembly showing the presence of the outside sleeve around the handle extruded insert, according to embodiments of the present invention.
FIG. 18 (on Sheet 4) illustrates a transverse cross section view of the handle extruded insert, according to embodiments of the present invention.
Figures 13B, 13C, 13D, 13E, 14B, 14C, 14D, 14E:
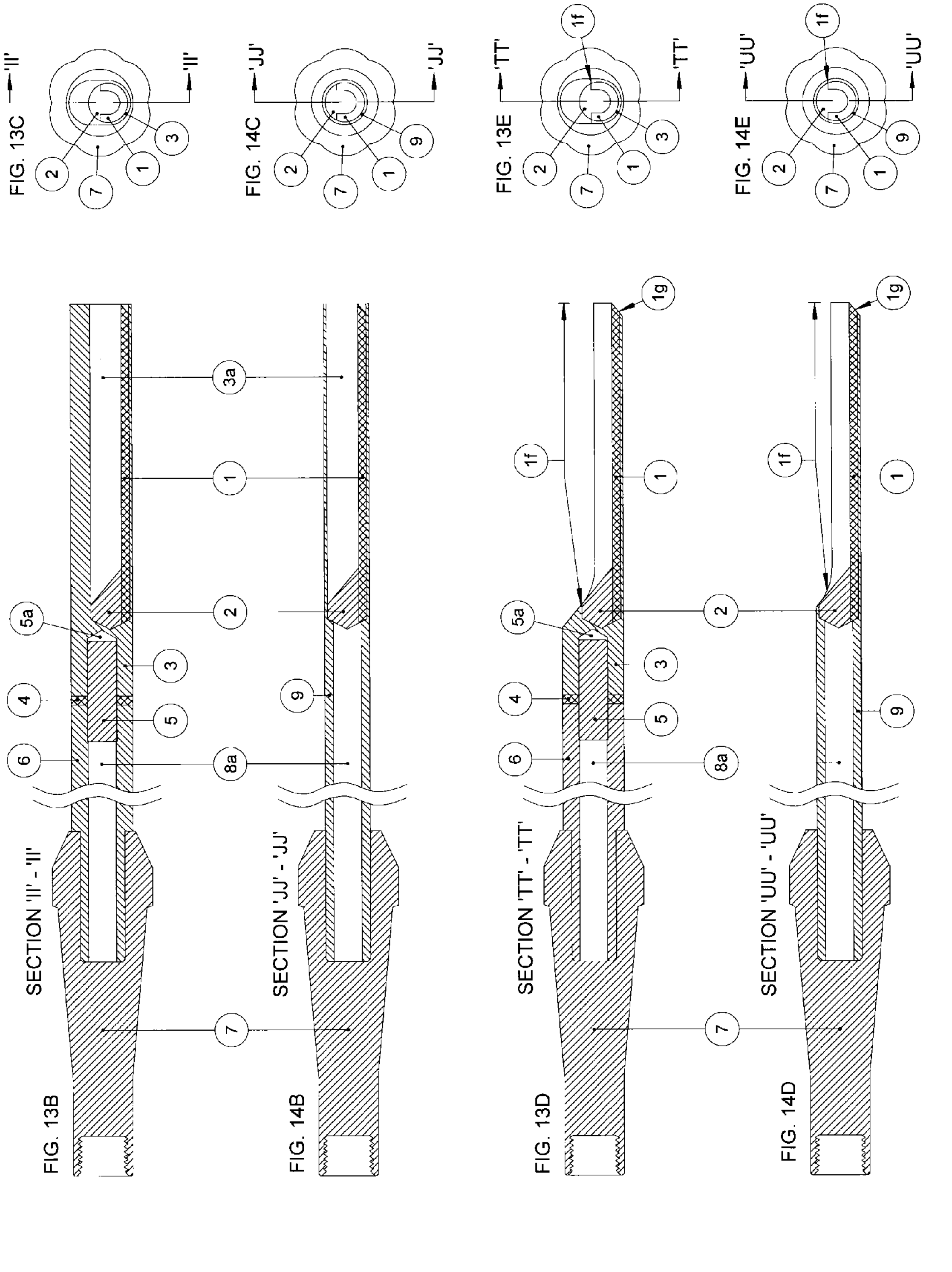
FIG. 13B (on Sheet 7) illustrates the longitudinal cross-section centerline view of the tool design that incorporates a replaceable cutting edge at the in-process stage where the blade is fully assembled but without shot filling and with some machining yet to be done, according to embodiments of the present invention.
FIG. 13C (on Sheet 7) illustrates an end view from the distal end of the tool of FIG. 13B, according to embodiments of the present invention.
FIG. 13D (on Sheet 7) illustrates the longitudinal cross-section centerline view of the tool of FIG. 13B at the in-process stage where the blade is fully assembled and with the flute opened after the last machining has been done, according to embodiments of the present invention.
FIG. 13E (on Sheet 7) illustrates an end view from the distal end of the tool of FIG. 13D, according to embodiments of the present invention.
FIG. 14B (on Sheet 7) illustrates the longitudinal cross-section centerline view of the tool design that incorporates a round shaft at the in-process stage where the blade is fully assembled but without shot filling and with some machining yet to be done, according to embodiments of the present invention.
FIG. 14C (on Sheet 7) illustrates an end view from the distal end of the tool of FIG. 14B, according to embodiments of the present invention.
FIG. 14D (on Sheet 7) illustrates the longitudinal cross-section centerline view of the tool design that incorporates a round shaft at the in-process stage where the blade is fully assembled and with the flute opened after the last machining has been done, according to embodiments of the present invention.
FIG. 14E (on Sheet 7) illustrates an end view from the distal end of the tool of FIG. 14D, according to embodiments of the present invention.

The handle outside sleeve 12 may be formed from a pultruded thick-walled tube made of a resin bonded composite of fiberglass and carbon and aramid fibers, according to embodiments of the present invention. Outside sleeve 12 may be produced in long lengths and subsequently cut to desired lengths. The shape and size of one example of the sleeve 12 is illustrated in FIG. 17E on Sheet 4. Both the shape and the size have been determined by ergonomic studies to be a best fit for the spectrum of woodturners, according to embodiments of the present invention.

The handle insert 13 is may be formed of an aluminum extrusion, sized to be a sliding fit within the sleeve 12, according to embodiments of the present invention. Insert 13 may be produced in longer lengths and subsequently cut to desired lengths. The shape and size of one example of a handle insert 13 is illustrated in FIG. 18 on P. 1D.

The handle distal end insert 10 may be formed of an aluminum extrusion, sized to be a profile match with the handle outside sleeve 12, according to embodiments of the present invention. Insert 10 may be produced in longer lengths and subsequently cut to desired lengths. It may then be machined into the configurations seen in the side view in FIG. 15A, the distal end view in FIG. 15D, and the isometric perspective views of FIG. 15 and FIG. 15B and the isometric longitudinal centerline cross section view of FIG. 15C, according to embodiments of the present invention.

The distal end insert 10 includes an internal conical taper portion that matches the taper shown as 7*d* on the tool bolster 7, according to embodiments of the present invention. According to embodiments of the present invention, this aspect of the handle assembly provides for engagement of the tool blade assembly to the handle. The distal end insert 10 may be adhered, glued, or otherwise engaged with the handle outside sleeve 12, according to embodiments of the present invention.

The handle threaded bolster locator 11 may be formed of 400 series stainless steel, which may be machined after appropriately sized bar stock is cut to size, according to embodiments of the present invention. A finished bolster locator 11 is illustrated in FIG. 16, according to embodiments of the present invention. After machining, the bolster locator 11 may be installed into the proximal end of the handle distal end insert 10 as illustrated in FIGS. 15C and 17B. For example, the bolster locator 11 may be adhered, glued, formed integrally, or otherwise engaged with distal end insert 10, according to embodiments of the present invention.

The handle proximal end insert 14 may be made in the same way and from the same material as that used for the distal end insert 10, according to embodiments of the present invention. According to embodiments of the present invention, handle proximal end insert 14 provides an interface for the insertion and securement of the handle end cap 15. A finished end insert 14 is illustrated in the exploded assembly views in FIGS. 24 and 27. After machining, end insert 14 may be installed into the proximal end of the handle as illustrated in FIGS. 19 and 21.

The handle end cap 15 may be made in the same way and from the same material as that used for the end inserts 10 and 14, according to embodiments of the present invention. A finished end cap 15 is illustrated in the exploded assembly views in FIGS. 24 and 27. After machining, end cap 15 may be installed into the proximal end of the handle proximal end insert 14 as illustrated in FIGS. 19 and 21.

According to some embodiments of the present invention, the assembly of the handle occurs in essentially five steps:

1. inserting the distal end cap assembly (pieces 10 and 11) and securing it with an appropriate adhesive;

2. installing the insert 13 and securing it with an appropriate adhesive up against the inside end of the distal end cap 10;

3. inserting the proximal end cap 14 and securing it with an appropriate adhesive;

4. selectively and optionally filling the chosen compartments of the insert 13 with metallic shot 8; and 5. finally, closing the proximal end of the handle by installing the end cap 15 in the threaded portion of the end cap 14.

According to embodiments of the present invention, the material out of which the edge insert 1 is made is more wear-resistant than the substrate metal (e.g. the shaft tip) into which it is inserted (e.g. the metal of the shaft tip 3). According to some embodiments of the present invention, the edge insert 1 is made with a ten to fifteen percent vanadium tool steel; according to other embodiments, other high alloy tool steels are used, for example high speed steels which contain both vanadium and tungsten to increase wear resistance. High speed steel which contains other elements such as cobalt to allow the steel to work at elevated temperatures may be used. According to embodiments of the present invention, preshaping the edge insert 1 and then making a reserve shape to add strength at the joint and not to expose the joint outside of the substrate, as well as deflect the shavings, permits any wear-resistant material to be used for the edge insert 1 to produce a cutting edge. Other materials which may be used for the edge insert 1 include high alloy tool steel, high speed steel, tungsten carbide, and/or ceramics such as zirconia and the like.

According to embodiments of the present invention, the substrate (e.g. the shaft tip 3) is a 400 series stainless steel, which may be brazed and then heat treated on the same cycle as the tool steels and high speed steels and still maintain the structural qualities and hardness required for the substrate. Other less expensive tool steels which may not have the corrosion resistance of stainless steel, but which would otherwise function in a similar manner and may be suitable for use as the substrate material.

The flute insert 2 may be made with almost any type of metal; according to some embodiments of the present invention, the flute insert 2 is made of the same kind of material as the substrate (e.g. the shaft tip 3).

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A woodturning tool, the woodturning tool comprising:

a shaft comprising a shaft tip, wherein the shaft tip is made of a first metal; and a cutting edge insert, at least a portion of an outer surface of the cutting edge insert rigidly joined to an inner surface of the shaft tip, the cutting edge insert formed of a second metal, the cutting edge insert being fluted and sharpened to form a cutting edge for woodturning, wherein the second metal is different from the first metal, and wherein the second metal is more wear-resistant than the first metal.

2. The woodturning tool of claim 1, wherein the second metal is a wear resistant alloy steel, and wherein the first metal is less expensive steel than the second metal.

3. The woodturning tool of claim 2, wherein the second metal has a vanadium content from ten to fifteen percent, and wherein the first metal is a 400-series stainless steel.

4. The woodturning tool of claim 1, wherein the shaft tip has an outer perimeter that is substantially uniform along its length, wherein the fluted cutting edge insert opens toward a first direction, and wherein a height of the shaft tip along the first direction is larger than a width of the shaft tip along a second direction perpendicular to the first direction.

5. The woodturning tool of claim 4, wherein the shaft has an outer perimeter that is substantially the same along its length, and wherein the shaft outer perimeter is the same as the shaft tip outer perimeter.

6. The woodturning tool of claim 1, wherein the at least a portion of the outer surface of the cutting edge insert is laminated to the inner surface of the shaft tip with brazing or polymeric adhesive.

7. The woodturning tool of claim 1, wherein the shaft comprises an annular recess at least partially filled with metallic spherules.

8. The woodturning tool of claim 7, wherein the tool permits addition of and withdrawal of the metallic spherules for user customized balancing and vibration dampening.

9. The woodturning tool of claim 1, wherein the shaft tip is rigidly and reversibly coupled to the shaft to permit exchange of the shaft tip and the cutting edge insert for a new shaft tip and a new cutting edge insert.

10. The woodturning tool of claim 9, further comprising a tenon and a gasket, wherein the gasket is located between a distal end of the shaft and a proximal end of the shaft tip, and wherein the tenon extends within the shaft, the shaft tip, and the gasket.

11. The woodturning tool of claim 1, further comprising a flute insert, the flute insert rigidly joined to both the inner surface of the shaft tip and a proximal inner surface of the cutting edge insert.

12. The woodturning tool of claim 11, wherein a distal face of the flute insert is beveled to provide chip deflection.

13. A method for manufacturing a woodturning tool, comprising:

forming a shaft;

forming a shaft tip of a first metal;

inserting a cutting edge insert into the shaft tip;

rigidly joining an outer surface of the cutting edge insert to an inner surface of the shaft tip, wherein the cutting edge insert is formed of a second metal, the cutting edge insert being fluted; and machining the cutting edge insert to form a cutting edge for woodturning, wherein the second metal is different from the first metal, and wherein the second metal is more wear-resistant than the first metal.

14. The method of claim 13, wherein machining the cutting edge insert comprises machining the cutting edge insert after rigidly joining the cutting edge insert to the shaft tip.

15. The method of claim 13, wherein rigidly joining the outer surface of the cutting edge insert to the inner surface of the shaft tip comprises laminating the outer surface of the cutting edge insert with the inner surface of the shaft tip by brazing or by applying a polymeric adhesive.

16. The method of claim 13, further comprising:

forming an annular recess in the shaft; and at least partially filling the annular recess with metallic spherules.

17. The method of claim 16, further comprising balancing the tool according to a user's preference by adding metallic spherules to the annular recess or withdrawing metallic spherules from the recess.

18. The method of claim 13, further comprising forming the shaft tip and the shaft as a single unitary structure.

19. The method of claim 13, further comprising rigidly and reversibly joining the shaft tip to the shaft to permit exchange of the shaft tip and the cutting edge insert for a new shaft tip and a new cutting edge insert.

20. The method of claim 13, further comprising:

forming a flute insert; and rigidly joining the flute insert to both the inner surface of the shaft tip and a proximal inner surface of the cutting edge insert.

* * * * *